(12) United States Patent
Huang et al.

(10) Patent No.: US 7,623,520 B2
(45) Date of Patent: Nov. 24, 2009

(54) METHOD AND APPARATUS FOR ROUTING PACKETS

(75) Inventors: Chih-Hua Huang, Tai-Chung Hsien (TW); Chun-Feng Liu, Taipei (TW); Jin-Ru Chen, Tai-Chung (TW)

(73) Assignee: Realtek Semiconductor Corp., HsinChu (TW)

( * ) Notice: Subject to any disclaimer, the term of this patent is extended or adjusted under 35 U.S.C. 154(b) by 507 days.

(21) Appl. No.: 10/907,124

(22) Filed: Mar. 21, 2005

(65) Prior Publication Data
US 2005/0213572 A1  Sep. 29, 2005

(30) Foreign Application Priority Data
Mar. 23, 2004  (TW) ............... 93107835 A

(51) Int. Cl.
*H04L 12/56* (2006.01)
(52) U.S. Cl. ............... 370/392; 370/395.32; 370/409; 709/238
(58) Field of Classification Search ........... 370/351, 370/389, 392, 395.1, 396, 397, 395.3, 395.31, 370/400, 401, 409, 395.32; 709/238, 242, 709/229
See application file for complete search history.

(56) References Cited

U.S. PATENT DOCUMENTS

| | | | | |
|---|---|---|---|---|
| 5,526,489 A * | 6/1996 | Nilakantan et al. | ......... | 709/228 |
| 5,790,541 A * | 8/1998 | Patrick et al. | ............... | 370/392 |
| 6,047,325 A * | 4/2000 | Jain et al. | .................... | 709/227 |
| 6,101,188 A * | 8/2000 | Sekine et al. | ............... | 370/401 |
| 6,157,644 A * | 12/2000 | Bernstein et al. | ............ | 370/392 |
| 6,256,314 B1 * | 7/2001 | Rodrig et al. | ............... | 370/401 |
| 6,778,540 B1 * | 8/2004 | Ratcliff et al. | ............... | 370/401 |
| 7,099,324 B2 * | 8/2006 | Kametani | ................... | 370/392 |
| 7,190,696 B1 * | 3/2007 | Manur et al. | ................. | 370/392 |
| 2002/0010799 A1 * | 1/2002 | Kubota et al. | ............... | 709/249 |
| 2002/0196802 A1 * | 12/2002 | Sakov et al. | ................ | 370/432 |
| 2003/0067929 A1 * | 4/2003 | Matsuzawa | ................. | 370/401 |
| 2003/0086425 A1 * | 5/2003 | Bearden et al. | ............. | 370/392 |
| 2003/0154297 A1 * | 8/2003 | Suzuki et al. | ............... | 709/229 |
| 2003/0225906 A1 * | 12/2003 | Natarajan et al. | ........... | 709/238 |
| 2005/0002405 A1 * | 1/2005 | Gao | ........................... | 370/401 |
| 2005/0073998 A1 * | 4/2005 | Zhu et al. | .................... | 370/352 |
| 2007/0064725 A1 * | 3/2007 | Minami et al. | .............. | 370/463 |

* cited by examiner

*Primary Examiner*—Kwang B Yao
*Assistant Examiner*—Jeffrey M Rutkowski
(74) *Attorney, Agent, or Firm*—Winston Hsu

(57) ABSTRACT

A method used for routing a data packet in a router having a first table used for recording a plurality of destination IP address and second table used for recording destination MAC address, wherein the plurality of destination IP address are different. The method includes: receiving a data packet and retrieving a destination IP address from the data packet; looking up an indication value corresponding to the destination IP address from the first table; selecting a destination MAC address from the second table according to the indication value as a nexthop for the data packet; and transmitting the data packet to the nexthop.

20 Claims, 4 Drawing Sheets

| Destination IP address (DIP) | Netmask | Type | NextHopStart | NextHopNum | Load Balance |
|---|---|---|---|---|---|
| 192.168.1.0 | 255.255.255.0 | Direct | 0 | 1 | — |
| 140.114.0.0 | 255.255.0.0 | Indirect | 1 | 2 | Round Robin |
| 0.0.0.0 | 0.0.0.0 | Indirect | 3 | 4 | Default value |

Fig. 3

METHOD AND APPARATUS FOR ROUTING PACKETS

BACKGROUND OF INVENTION

1. Field of the Invention

The present invention relates to a communication system, and more particularly, to a routing device.

2. Description of the Prior Art

With the rapid development of networks, the routing technique and the application of routers become more and more important.

A router is typically connected to several networks, and the connection situations between the networks are recorded in a routing table. In a conventional router, each row of the routing table represents a route of a data packet that is to be transmitted outward from the router. The destination information of the route, such as a destination IP address, network mask (or subnet), and nexthop are recorded in the row. When a data packet is received, the router looks up a nexthop for the data packet from the routing table according to the destination IP address recorded in the header of the data packet. The router then transmits the data packet to the nexthop. Being continually transmitted through different routers, the data packet is eventually transmitted to the destination IP address.

However, there may be many alternative routes to transmit the same data packet, i.e. a single destination IP address may correspond to a plurality of alternative nexthops. In the prior art, the router records the relationship between the destination IP address and the plurality of nexthops in a plurality of rows of the routing table, respectively. As a result, the routing table of the prior art is recorded with duplicate destination IP addresses and network masks so that the usage efficiency of the memory in the router is thereby decreased.

SUMMARY OF INVENTION

It is therefore an objective of the claimed invention to provide a routing method to improve the usage efficiency of the memory in a router.

Another objective of the claimed invention is to provide a routing method capable of supporting multi nexthop, multi default gateway, or/and multi NAPT (Network Address Port Translation) IP.

Another objective of the claimed invention is to provide a routing method capable of allocating networking bandwidth according to load balance rules.

The present invention discloses a method for routing a packet in a router having a first table for recording a plurality of unrepeated destination IP addresses and a second table for recording a plurality of MAC addresses. The method includes: receiving the packet and reading a destination IP address from the packet; looking up an indication value from the first table according to the destination IP address; selecting one of the MAC addresses as a nexthop for the packet from the second table according to the indication value; and transmitting the packet to the nexthop.

According to a preferred embodiment, an apparatus for routing a packet is disclosed. The apparatus includes: a first table recording a plurality of unrepeated destination IP addresses; a second table recording a plurality of MAC addresses; a receiving circuit receiving the packet and reading a destination IP address from the packet; a control circuit looking up an indication value from the first table according to the destination IP address and selecting one of the MAC addresses as a nexthop from the second table according to the indication value; and a transmitting circuit coupled to the control circuit for transmitting the packet to the nexthop.

These and other objectives of the present invention will no doubt become obvious to those of ordinary skill in the art after reading the following detailed description of the preferred embodiment that is illustrated in the various figures and drawings.

BRIEF DESCRIPTION OF DRAWINGS

FIG. 3 is a schematic diagram of a first table according to the present invention.

DETAILED DESCRIPTION

Figure 1:
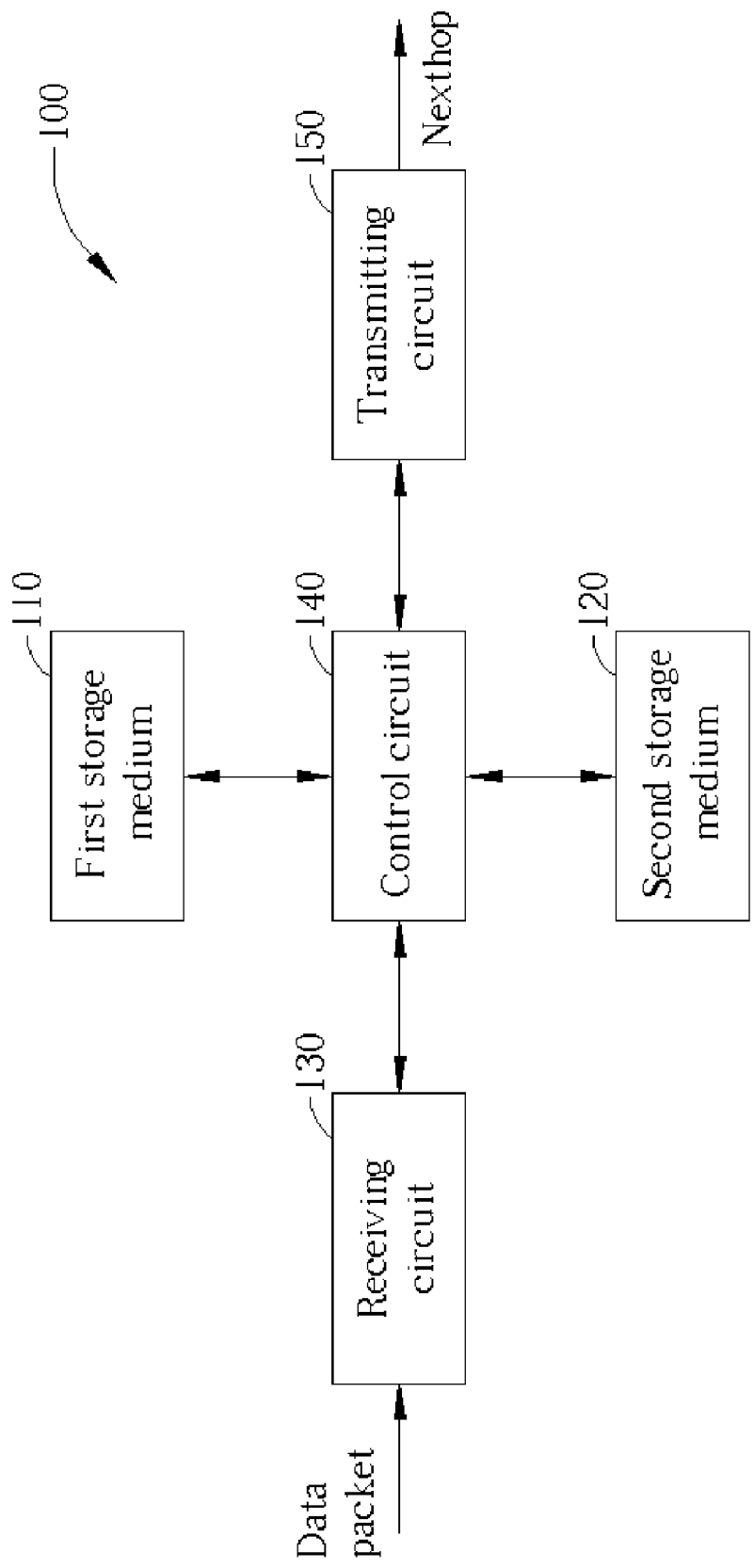
FIG. 1 is a schematic diagram of a routing device according to the present invention.

FIG. 1 depicts a schematic diagram of a routing device 100 according to the present invention. The routing device 100 comprises a first storage medium 110, a second storage medium 120, a receiving circuit 130, a control circuit 140, and a transmitting circuit 150. In practical implementations, the control circuit 140 can be a microprocessor, an ASIC (application specific integrated circuit), or other control units.

Figure 2:
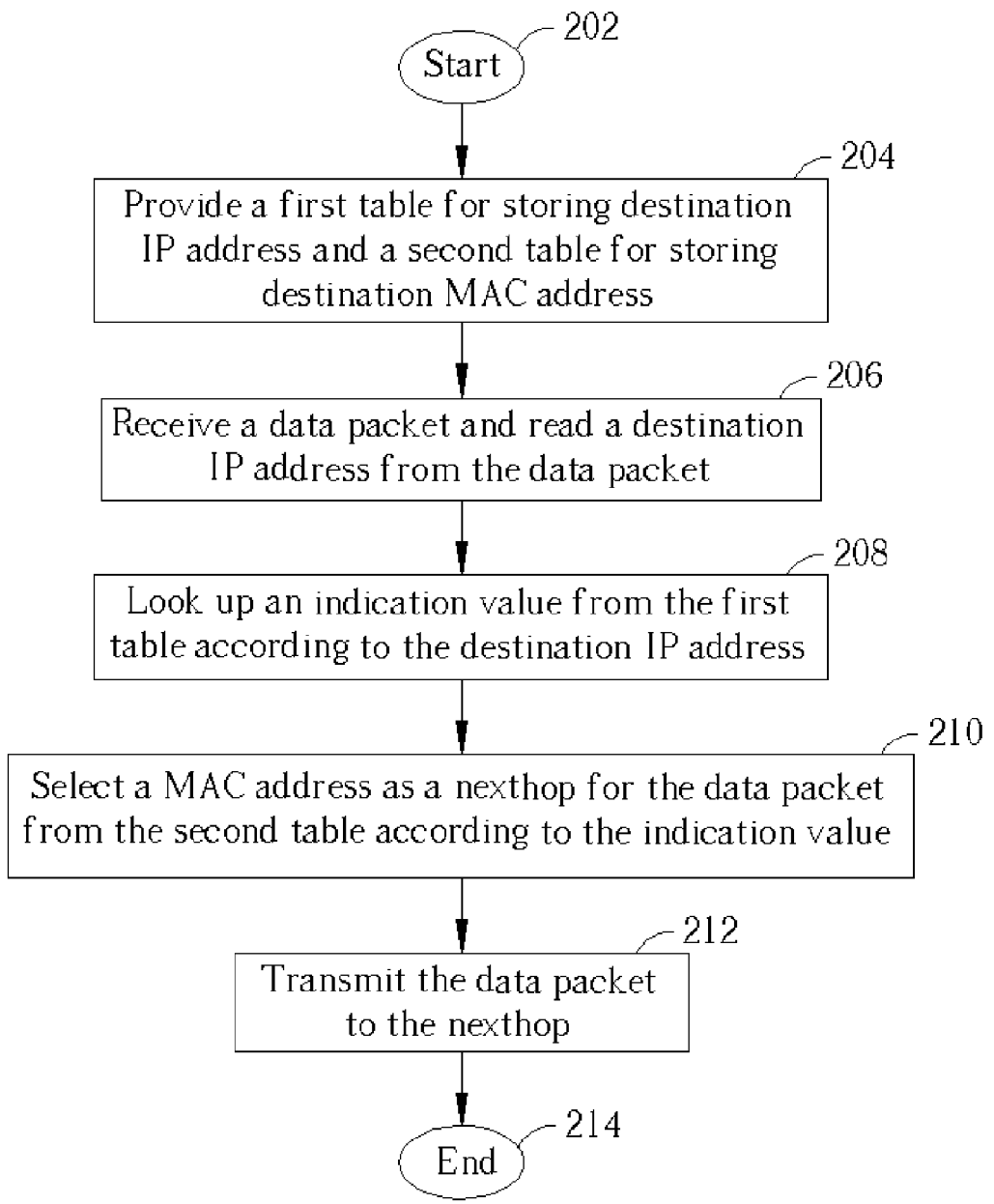
FIG. 2 is a flowchart of a routing method according to the present invention.
Figure 4:
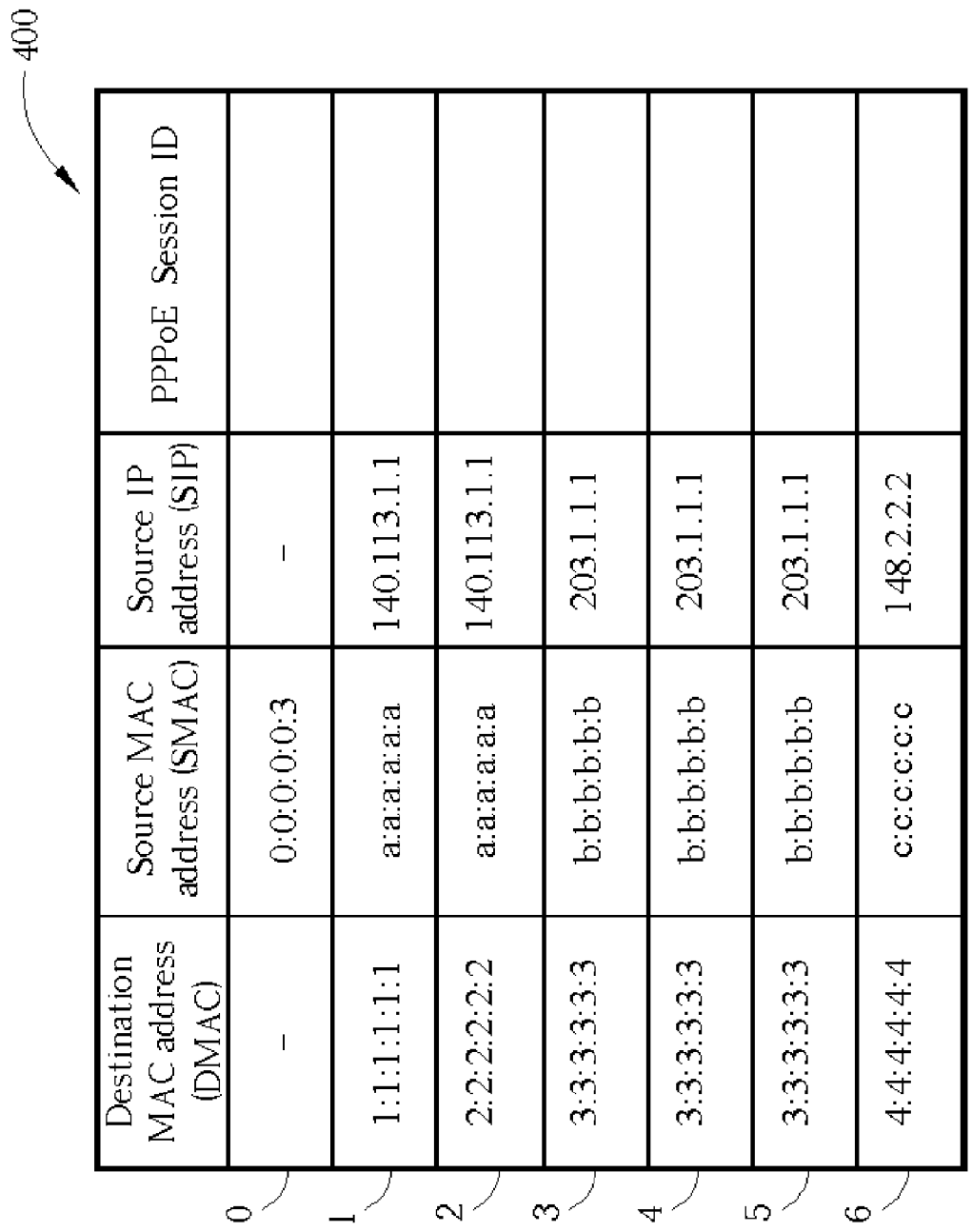
FIG. 4 is a schematic diagram of a second table according to the present invention.

FIG. 2 depicts a flowchart of the routing operation of the routing device 100 according to the present invention. In step 204, the routing device 100 records destination IP addresses (DIP), network mask (Netmask), and other associated data in a first table 300, as shown in FIG. 3, according to its routing rules. The first table 300 is stored in the first storage medium 110. In addition, the routing device 100 further records destination MAC addresses (DMAC), corresponding to the destination IP addresses recorded in the first table 300, in a second table 400 as shown in FIG. 4. The second table 400 is stored in the second storage medium 120. In practice, the first storage medium 110 and the second storage medium 120 can be different sections of a memory. In another embodiment, each of the two storage mediums can be either a volatile or a non-volatile memory, respectively.

As the first table 300 shown in FIG. 3, the data recorded in each row corresponds to the routing rule of the routing device 100. Each row records a destination IP address (in a column 301) and a corresponding network mask (in a column 302). A set of a destination IP address and a network mask defines a destination network. In each row of the first table 300, the connection relationship between the destination network and the routing device 100 is recorded in a column 303. For example, the routing type recorded in a row 310 is "Direct," meaning that the destination network 192.168.1.0/24 is directly connected to the routing device 100. The routing type recorded in another row 320 is "Indirect," meaning that the destination network 140.114.0.0/16 is not directly connected to the routing device 100.

The second table 400 shown in FIG. 4 records the destination MAC address (DMAC) and source MAC address (SMAC) for transmitting the data packet. In practice, the second table 400 can further record the source IP address (SIP) for use in network address translation (NAT) or network address/port translation (NAPT). The relationship between the second table 400 and the first table 300 is recorded as a start point of nexthop—NextHopStart—and a number of associated nexthops—NextHopNum. The start point of nexthop—NextHopStart—is recorded in a column 304 and the number of nexthops—NextHopNum—is recorded in a column 305. For example, in row 310 of the first table 300, the NextHopStart is 0 and the NextHopNum is 1. This means that the routing rule recorded in row 310 only corresponds to row 0 of the second table 400. In row 320, the NextHopStart is 1 and the NextHopNum is 2. This represents that the routing rule of row 320 corresponds to row 1 and row 2 of the second table 400.

In step 204, when the routing rule of a specific destination network allows a multi-nexthop setting, the routing device 100 of the present invention records the destination IP address and network mask in the first table 300 and records a plurality of nexthops corresponding to the destination network in the second table 400 to save the required memory space. In other words, the first table 300 does not record repeated data associated with the destination network.

In step 206, the routing device 100 receives a data packet Packet_A via the receiving circuit 130 and reads a destination IP address DIP_A from the header of the Packet_A.

Next, in step 208, the control circuit 140 looks up the routing type of the destination IP address DIP_A from the first table 300. For example, the DIP_A is assumed as 192.168.1.0. As shown in FIG. 3, the routing type of DIP_A recorded in row 310 of the first table 300 is "Direct." The control circuit 140 then looks up a destination MAC address DMAC_A corresponding to the destination IP address DIP_A from an address resolution protocol (ARP) table and replaces the SMAC in the header of the Packet_A with the SMAC recorded in row 0 of the second table 400. Preferably, the routing device 100 then directly performs step 212 to transmit the Packet_A to a machine corresponding to DMAC_A via the transmitting circuit 150.

However, suppose now that the receiving circuit 130 receives another data packet—Packet_B—in step 206 and the destination IP address DIP_B is assumed as 140.114.0.0. According to row 320 of the first table 300, it is known that the routing type of DIP_B is "Indirect." Therefore, the control circuit 140 looks up the NextHopStart_B and NextHopNum_B recorded in row 320 from the first table 300 in step 208 and then looks up the corresponding data from the second table 400 according to the indication value recorded in the above two columns of the first table 300.

In step 210, since the NextHopStart_B recorded in row 320 of the first table 300 is 1 and the NextHopNum_B is 2, the control circuit 140 looks up the data recorded in two rows, which begins from row 1 of the second table 400 and selects a DMAC recorded in one of the two rows as the DMAC_B for use in the transmission of the Packet_B. In one embodiment, for example, the control circuit 140 selects either row 1 or row 2 of the second table 400 as the nexthop of the Packet_B according to a load balance rule recorded in the column 306 of the first table 300. The control circuit 140 can configure a load balance rule, such as round robin, source IP based, or session based etc. for each routing rule recorded in the first table 300. In addition, the control circuit 140 can also use a default load balance setting to implement routing process.

In this embodiment, since the load balance rule recorded in the row 320 of the first table 300 is round robin, the control circuit 140 alternates between using the DMAC recorded in row 1 and the DMAC recorded in row 2 of the second table 400 to route data packets to be transmitted to the destination network 140.114.0.0/16.

For each routing rule, the data of destination networks and data of corresponding nexthops are recorded in the first table 300 and the second table 400, respectively, according to the present invention. This method can support multi-nexthop and multi NAPT IP setting and can also greatly reduce the required memory space by avoiding recording repeated data in a single table. In addition, the routing method of the present invention can also support the setting of multi-gateway. For example, if the routing device 100 has two alternative gateways, one has a bandwidth of 1.5 Mbps and the other one has a bandwidth of 512 Kbps, the routing device 100 can configure a plurality of nexthops in the second table 400 based on the bandwidth ratio of the two gateways. For example, the route with 1.5 Mbps can be configured as three identical nexthops and the route with 512 Kbps can be configured as one nexthop. As shown in FIG. 4, rows 3, 4, and 5 correspond to the route with 1.5 Mbps while row 6 corresponds to the route with 512 Kbps. As a result, the routing device 100 balances the bandwidth usages of different gateways.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for routing a packet in a routing device having a routing rule of a specific destination IP allowing a multi-nexthop setting, the method comprising:
   providing a first table in the routing device for recording a plurality of unrepeated destination IP addresses reachable from the routing device, the unrepeated destination IP addresses including the specific destination IP allowing the multi-nexthop setting;
   providing a second table in the routing device for recording a plurality of MAC addresses, the second table including at least one possible MAC address corresponding to each destination IP address in the first table, and a plurality of possible MAC addresses corresponding to the specific destination IP allowing the multi-nexthop setting;
   looking up, in the first table, a destination IP address read from the packet to thereby obtain an indication value corresponding to a range of all the possible MAC addresses in the second table for the destination IP address read from the packet;
   selecting one of the possible MAC addresses in the range from the second table as a nexthop; and
   transmitting the packet to the nexthop.

2. The method of claim 1, wherein the selecting step further comprises selecting one of the possible MAC addresses in the range from the second table as the nexthop utilizing a round robin rule.

3. The method of claim 1, wherein the selecting step further comprises utilizing a load balance rule corresponding to the destination IP address to select one of the possible MAC addresses in the range from the second table as the nexthop.

4. The method of claim 3, wherein the load balance rule is recorded in the first table.

5. The method of claim 1, wherein the routing device supports a setting of multi-gateways, a plurality of nexthops are configured based on bandwidth ratio of the multi-gateways.

6. The method of claim 1, wherein the second table further records at least one source IP address for use in NAT or NAPT processing.

7. The method of claim 1, wherein the indication value for each compared destination IP address comprises a starting row and a number of rows of the second table, the staffing row corresponding to a first possible MAC address in the second table for the compared destination IP address, and the number of rows corresponding to how many possible MAC addresses are stored in the second table for the compared destination IP address.

8. A packet routing apparatus having a routing rule of a specific destination IP allowing a multi-nexthop setting, the apparatus comprising:
- a first table for recording a plurality of unrepeated destination IP addresses reachable from the routing device, the unrepeated destination IP addresses including the specific destination IP allowing the multi-nexthop setting;
- a second table for recording a plurality of MAC addresses, the second table including at least one possible MAC address corresponding to each destination IP address in the first table, and a plurality of possible MAC addresses corresponding to the specific destination IP allowing the multi-nexthop setting;
- a control circuit for looking up, in the first table, a destination IP address read from a packet to thereby obtain an indication value corresponding to a range of all the possible MAC addresses in the second table for the destination IP address read from the packet, and for selecting one of the possible MAC addresses in the range from the second table as a nexthop; and
- a transmitting circuit for transmitting the packet to the nexthop.

9. The apparatus of claim 8, wherein the control circuit is further for selecting one of the possible MAC addresses in the range from the second table as the nexthop utilizing a round robin rule.

10. The apparatus of claim 8, wherein the control circuit further utilizes a load balance rule corresponding to the destination IP address to select one of the possible MAC addresses in the range from the second table as the nexthop.

11. The apparatus of claim 10, wherein the load balance rule is recorded in the first table.

12. The apparatus of claim 8, wherein each of the destination IP addresses recorded in the first table corresponds to at least one MAC address recorded in the second table.

13. The apparatus of claim 8, wherein each MAC address comprises a destination MAC address and a source MAC address.

14. The apparatus of claim 8, the apparatus supports a setting of multi-gateways and configures a plurality of nexthops in the second table based on bandwidth ratio of the multi-gateways.

15. The apparatus of claim 8, wherein the second table further records source IP addresses for use in NAT or NAPT processing.

16. The apparatus of claim 8, wherein the indication value for each compared destination IP address comprises a staffing row and a number of rows of the second table, the staffing row corresponding to a first possible MAC address in the second table for the compared destination IP address, and the number of rows corresponding to how many possible MAC addresses are stored in the second table for the compared destination IP address.

17. A packet routing apparatus having a routing rule of a specific destination IP allowing a multi-nexthop setting, the apparatus comprising:
- a first storage medium for recording a plurality of unrepeated destination IP addresses reachable from the routing device, the unrepeated destination IP addresses including the specific destination IP allowing the multi-nexthop setting;
- a second storage medium for recording a plurality of MAC addresses, the second storage medium including at least one possible MAC address corresponding to each destination IP address in the first storage medium, and a plurality of possible MAC addresses corresponding to the specific destination IP allowing the multi-nexthop setting;
- a control circuit for looking up, in the first storage medium, a destination IP address read from a packet to thereby obtain an indication value corresponding to a range of all the possible MAC addresses in the second storage medium for the destination IP address read from the packet, and for selecting one of the possible MAC addresses in the range from the second storage medium as a nexthop; and
- a transmitting circuit for transmitting the packet to the nexthop.

18. The apparatus of claim 17, wherein the first storage medium and the second storage medium are in a storage unit.

19. The apparatus of claim 17, wherein the indication value for each compared destination IP address comprises a staffing row and a number or rows of the second storage medium, the starting row corresponding to a first possible MAC address in the second storage medium for the compared destination IP address, and the number of rows corresponding to how many possible MAC addresses are stored in the second storage medium for the compared IP address.

20. The apparatus of claim 17, wherein the apparatus supports a setting of multi-gateways and configures a plurality of nexthops in the second storage medium based on bandwidth ratio of the multi-gateways.

* * * * *